(12) United States Patent
Flint et al.

(10) Patent No.: US 6,453,419 B1
(45) Date of Patent: Sep. 17, 2002

(54) SYSTEM AND METHOD FOR IMPLEMENTING A SECURITY POLICY

(75) Inventors: Andrew Flint, Oakville; Irving Reid; Gene Amdur, both of Toronto, all of (CA)

(73) Assignee: Secure Computing Corporation, Roseville, MN (US)

( * ) Notice: Subject to any disclaimer, the term of this patent is extended or adjusted under 35 U.S.C. 154(b) by 0 days.

(21) Appl. No.: 09/040,827

(22) Filed: Mar. 18, 1998

(51) Int. Cl.7 .............................................. G06F 12/14
(52) U.S. Cl. ....................................................... 713/201
(58) Field of Search .................................. 713/200, 201; 709/223, 225, 232

(56) References Cited

U.S. PATENT DOCUMENTS

| | | | |
|---|---|---|---|
| 3,956,615 A | 5/1976 | Anderson et al. ...... 235/61.7 B |
| 4,104,721 A | 8/1978 | Markstein et al. .......... 364/200 |
| 4,177,510 A | 12/1979 | Appell et al. ............... 364/200 |
| 4,442,484 A | 4/1984 | Childs, Jr. et al. .......... 364/200 |
| 4,584,639 A | 4/1986 | Hardy ........................ 364/200 |
| 4,621,321 A | 11/1986 | Boebert et al. ............. 364/200 |
| 4,648,031 A | 3/1987 | Jenner ........................ 364/200 |
| 4,701,840 A | 10/1987 | Boebert et al. ............. 364/200 |
| 4,710,763 A | * 12/1987 | Franke et al. ................. 345/10 |
| 4,713,753 A | 12/1987 | Boebert et al. ............. 364/200 |
| 4,870,571 A | 9/1989 | Frink .......................... 364/200 |
| 4,885,789 A | 12/1989 | Burger et al. ................. 380/25 |
| 4,914,568 A | 4/1990 | Kodosky et al. ............ 364/200 |
| 5,093,914 A | 3/1992 | Coplien et al. ............. 395/700 |
| 5,124,984 A | 6/1992 | Engel ........................ 370/94.1 |

(List continued on next page.)

FOREIGN PATENT DOCUMENTS

| | | | |
|---|---|---|---|
| EP | 0 554 182 A1 | 4/1993 | .......... H04L/29/06 |
| EP | 0 743 777 A2 | 11/1996 | .......... H04L/29/06 |
| GB | 2287619 A | 9/1995 | .......... H04L/12/22 |
| WO | 96/13113 | 5/1996 | .......... H04L/29/06 |
| WO | 96/35994 | 11/1996 | .......... G06F/13/14 |
| WO | 97/13340 | 4/1997 | ............. H04L/9/00 |
| WO | 97/26731 | 7/1997 | ............. H04L/9/00 |
| WO | 97/26734 | 7/1997 | ............. H04L/9/00 |
| WO | 97/26735 | 7/1997 | ............. H04L/9/00 |
| WO | 97/29413 | 8/1997 | |

OTHER PUBLICATIONS

"A general Purpose Proxy Filtering Mechanism Applied to the Mobile Environment", ACM Wireless Networks, vol. 5, 1999., pp. 391–409.*

(List continued on next page.)

Primary Examiner—James P. Trammell
Assistant Examiner—Pierre E. Elisca
(74) Attorney, Agent, or Firm—Schwegman, Lundberg, Woessner & Kluth

(57) ABSTRACT

A system and method of implementing a security policy, comprising the steps of providing a plurality of access policies, defining a process and connecting the access policies and the process to form a security policy.

8 Claims, 11 Drawing Sheets

U.S. PATENT DOCUMENTS

| | | | | |
|---|---|---|---|---|
| 5,153,918 | A | | 10/1992 | Tuai .............................. 380/25 |
| 5,204,961 | A | * | 4/1993 | Barlow ........................ 713/201 |
| 5,228,083 | A | | 7/1993 | Lozowick et al. .............. 380/9 |
| 5,263,147 | A | | 11/1993 | Francisco et al. ........... 395/425 |
| 5,272,754 | A | | 12/1993 | Boebert ........................ 380/25 |
| 5,276,735 | A | | 1/1994 | Boebert et al. ................ 380/21 |
| 5,303,303 | A | | 4/1994 | White ........................... 380/49 |
| 5,305,385 | A | | 4/1994 | Schanning et al. ............ 380/49 |
| 5,311,593 | A | | 5/1994 | Carmi ........................... 380/23 |
| 5,315,657 | A | * | 5/1994 | Abadi et al. ................. 713/201 |
| 5,329,623 | A | | 7/1994 | Smith et al. ................. 395/275 |
| 5,333,266 | A | | 7/1994 | Boaz et al. .................. 395/200 |
| 5,355,474 | A | | 10/1994 | Thuraisngham et al. .... 395/600 |
| 5,388,189 | A | * | 2/1995 | Kung ............................ 706/45 |
| 5,414,833 | A | | 5/1995 | Hershey et al. .............. 395/575 |
| 5,416,842 | A | | 5/1995 | Aziz .............................. 380/30 |
| 5,455,828 | A | | 10/1995 | Zisapel ....................... 370/85.3 |
| 5,485,460 | A | | 1/1996 | Schrier et al. .............. 370/94.1 |
| 5,511,122 | A | | 4/1996 | Atkinson ...................... 380/25 |
| 5,548,646 | A | | 8/1996 | Aziz et al. .................... 380/23 |
| 5,550,984 | A | | 8/1996 | Gelb ....................... 395/200.17 |
| 5,566,170 | A | | 10/1996 | Bakke et al. ................. 370/60 |
| 5,583,940 | A | | 12/1996 | Vidrascu et al. .............. 380/49 |
| 5,586,260 | A | | 12/1996 | Hu ........................... 395/200.2 |
| 5,604,490 | A | | 2/1997 | Blakley, III et al. .... 340/825.31 |
| 5,606,668 | A | | 2/1997 | Shwed .................. 395/200.11 |
| 5,615,340 | A | | 3/1997 | Dai et al. .............. 395/200.17 |
| 5,619,648 | A | | 4/1997 | Canale et al. .......... 395/200.01 |
| 5,623,601 | A | | 4/1997 | Vu ......................... 395/187.01 |
| 5,636,371 | A | | 6/1997 | Yu ............................. 395/500 |
| 5,644,571 | A | | 7/1997 | Seaman ...................... 370/401 |
| 5,671,279 | A | | 9/1997 | Elgamal ...................... 380/23 |
| 5,673,322 | A | | 9/1997 | Pepe et al. .................... 380/49 |
| 5,684,951 | A | | 11/1997 | Goldman et al. ...... 395/188.01 |
| 5,689,566 | A | | 11/1997 | Nguyen ....................... 380/25 |
| 5,699,513 | A | | 12/1997 | Feigen et al. .......... 395/187.01 |
| 5,706,507 | A | | 1/1998 | Schloss ....................... 395/615 |
| 5,708,780 | A | | 1/1998 | Levergood et al. .... 395/200.12 |
| 5,828,893 | A | * | 10/1998 | Wied et al. ................. 709/229 |
| 5,835,758 | A | * | 11/1998 | Nochur et al. .............. 707/102 |
| 5,859,966 | A | * | 1/1999 | Hayman et al. ............ 713/200 |
| 5,907,620 | A | * | 5/1999 | Klemba ........................ 380/25 |
| 5,987,606 | A | * | 11/1999 | Cirasole et al. ............. 713/200 |
| 5,991,807 | A | * | 11/1999 | Schmidt et al. ............. 709/225 |
| 5,991,879 | A | * | 11/1999 | Johnston et al. ............ 713/200 |
| 5,996,011 | A | * | 11/1999 | Humes ....................... 709/225 |
| 5,996,077 | A | * | 11/1999 | Williams .................... 713/200 |
| 6,182,226 | B1 | * | 1/2001 | Irving et al. ................ 713/201 |

OTHER PUBLICATIONS

"Role–based Access Control with the Security Administration Manager (SAM)", ACM 1997 RBAC Conference, pp. 61–68.*

Boebert, W.E., et al., "Secure Ada Target: Issues, System Design, and Verification", *Proceedings of the Symposium on Security and Privacy*, Oakland, California, pp. 59–66, (1985).

Boebert, W.E., et al., "Secure Computing: The Secure Ada Target Approach", *Sci. Honeyweller.* 6(2), 17 pages, (1985).

International Search Report, PCT Application No. PCT/US 95/12681, 8 p. (mailed Apr. 9, 1996).

News Release: "100% of Hackers Failed to Break Into One Internet Site Protected by Sidewinder™", Secure Computing Corporation (Feb. 16, 1995).

News Release: "Internet Security System Given 'Product of the Year' Award", Secure Computing Corporation (Mar. 28, 1995).

News Release: "SATAN No Threat to Sidewinder™", Secure Computing Corporation (Apr. 26, 1995).

"Answers to Frequently Asked Questions About Network Security", Secure Computing Corporation, pp. 1–41 & pp. 1–16 (Sep. 25, 1994).

"Sidewinder Internals", Product information, Secure Computing Corporation, 16 p. (Oct. 1994).

"Special Report: Secure Computing Corporation and Network Security", *Computer Select*, 13 p. (Dec. 1995).

Adam, J.A., "Meta–Matrices", *IEEE Spectrum*, p. 26 (Oct. 1992).

Adam, J.A., "Playing on the Net", *IEEE Spectrum*, p. 29 (Oct. 1992).

Ancilotti, P., et al., "Language Features for Access Control", *IEEE Transactions on Software Engineering*, SE–9, 16–25 (Jan. 1983).

Badger, L., et al., "Practical Domain and Type Enforcement for UNIX", *Proceedings of the 1995 IEEE Symposium on Security and Privacy*, pp. 66–77 (May 1995).

Belkin, N.J., et al., "Information Filtering and Information Retrieval: Two Sides of the Same Coin?", *Communications of the ACM*, 35, 29–38 (Dec. 1992).

Bellovin, S.M., et al., "Network Firewalls", *IEEE Communications Magazine*, 32, 50–57 (Sep. 1994).

Bevier, W.R., et al., "Connection Policies and Controlled Interference", *Proceedings of the Eighth IEEE Computer Security Foundations Workshop*, Kenmare, Ireland, p. 167–176 (Jun. 13–15, 1995).

Bowen, T.F., et al., "The Datacycle Architecture", *Communications of the ACM*, 35, 71–81 (Dec. 1992).

Bryan, J., "Firewalls For Sale", *BYTE*, 99–100, 102, 104–105 (Apr. 1995).

Cobb, S., "Establishing Firewall Policy", *IEEE*, 198–205 (1996).

Damashek, M., "Gauging Similarity with n–Grams: Language–Independent Categorization of Text", *Science*, 267, 843–848 (Feb. 10, 1995).

Dillaway, B.B., et al., "A Practical Design For A Multilevel Secure Database Management System", *American Institute of Aeronautics and Astronautics, Inc.*, pp. 44–57 (Dec. 1986).

Fine, T., et al., "Assuring Distributed Trusted Mach", *Proceedings of the IEEE Computer Society Symposium on Research in Security and Privacy*, pp. 206–218 (1993).

Foltz, P.W., et al., "Personalized Information Delivery: An Analysis of Information Filtering Methods", *Communications of the ACM*, 35, 51–60 (Dec. 1992).

Gassman, B., "Internet Security, and Firewalls Protection on the Internet", *IEEE*, 93–107 (1996).

Goldberg, D., et al., "Using Collaborative Filtering to Weave an Information Tapestry", *Communications of the ACM*, 35, 61–70 (Dec. 1992).

Grampp, F.T., "UNIX Operating System Security", *AT&T Bell Laboratories Technical Journal*, 63, 1649–1672 (Oct. 1984).

Greenwald, M., et al., "Designing an Academic Firewall: Policy, Practice, and Experience with SURF", *IEEE*, 79–92 (1996).

Haigh, J.T., et al., "Extending the Noninterference Version of MLS for SAT", *Proceedings of the 1986 IEEE Symposium on Security and Privacy*, Oakland, CA, pp. 232–239 (Apr. 7–9, 1986).

Karn, P., et al., "The ESP DES–CBC Transform", Network Working Group, Request for Comment No. 1829, http//ds.internic.net/rfc/rfc1829.txt, 9 p. (Aug. 1995).

Kent, S.T., "Internet Privacy Enhanced Mail", *Communications of the ACM,* 36, 48–60 (Aug. 1993).

Lampson, B.W., et al., "Dynamic Protection Structures", *AFIPS Conference Proceedings,* 35, 1969 Fall Joint Computer Conference, Las Vegas, NV, 27–38 (Nov. 18–20, 1969).

Lee, K.C., et al., "A Framework for Controlling Cooperative Agents", *Computer,* 8–16 (Jul. 1993).

Lodin, S.W., et al., "Firewalls Fend Off Invasions from the Net", *IEEE Spectrum,* 26–34 (Feb. 1998).

Loeb, S., "Architecting Personalized Delivery of Multimedia Information", *Communications of the ACM,* 35, 39–48 (1992).

Loeb, S., et al., "Information Filtering", *Communications of the ACM,* 35, 26–28 (Dec. 1992).

McCarthy, S.P., "Hey Hackers! Secure Computing Says You Can't Break into This Telnet Site", *Computer Select,* 2 p. (Dec. 1995).

Merenbloom, P., "Network 'Fire Walls' Safeguard LAN Data from Outside Intrusion", *Infoworld,* p. 69 & addnl. page (Jul. 25, 1994).

Metzger, P., et al., "IP Authentication using Keyed MD5", Network Working Group, Request for Comments No. 1828, http//ds.internic.net/rfc/rfc1828.txt, 5 p. (Aug. 1995).

Obraczka, K., et al., "Internet Resource Discovery Services", *Computer,* 8–22 (Sep. 1993).

Peterson, L.L., et al., In: *Computer Networks,* Morgan Kaufmann Publishers, Inc., San Francisco, CA, pp. 218–221, 284–286 (1996).

Press, L., "The Net: Progress and Opportunity", *Communications of the ACM,* 35, 21–25 (Dec. 1992).

Schroeder, M.D., et al., "A Hardware Architecture for Implementing Protection Rings", *Communications of the ACM,* 15, 157–170 (Mar. 1972).

Schwartz, M.F., "Internet Resource Discovery at the University of Colorado", *Computer,* 25–35 (Sep. 1993).

Smith, R.E., "Constructing a High Assurance Mail Guard", Secure Computing Corporation (Appeared in the Proceedings of the National Computer Security Conference), 7 p. (1994).

Smith, R.E., "Sidewinder: Defense in Depth Using Type Enforcement", *International Journal of Network Management,* p. 219–229 (Jul.–Aug. 1995).

Stadnyk, I., et al., "Modeling User's Interests in Information Filters", *Communications of the ACM,* 35, 49–50 (Dec. 1992).

Stempel, S., "IpAccess—An Internet Service Access System for Firewall Installations", *IEEE,* 31–41 (1995).

Stevens, C., "Automating the Creation of Information Filters", *Communications of the ACM,* 35, 48 (Dec. 1992).

Thomsen, D., "Type Enforcement: The New Security Model", *SPIE,* 2617, 143–150 (1995).

Warrier, U.S., et al., "A Platform for Heterogeneous Interconnection Network Management", *IEEE Journal on Selected Areas in Communications,* 8, 119–126 (Jan. 1990).

White, L.J., et al., "A Firewall Concept for Both Control–Flow and Data–Flow in Regression Integration Testing", *IEEE,* 262–271 (1992).

Wolfe, A., "Honeywell Builds Hardware for Computer Security", *Electronics,* 14–15 (Sep. 2, 1985).

\* cited by examiner

SYSTEM AND METHOD FOR IMPLEMENTING A SECURITY POLICY

BACKGROUND OF THE INVENTION

1. Field of the Invention

The present invention is related to computer network security, and more particularly to a system and method for representing and implementing a security policy.

2. Background Information

Recent developments in technology have made access easier to publicly available computer networks, such as the Internet. Organizations are increasingly turning to external networks such as the Internet to foster communication between employees, suppliers and clients. With this increased access comes an increased vulnerability to malicious activities on the part of both people inside and outside the organization. Firewalls have become an essential tool in controlling the flow of data between internal networks and these external networks.

A firewall is a system which enforces a security policy on communication traffic entering and leaving an internal network. An overview of firewall technology is provided in "Firewalls fend off invasions from the Net" published February 1998 in *IEEE Spectrum*, the discussion of which is hereby incorporated by reference. Access Control Lists (ACLs) are a very important part of a firewall design. These lists are used to both restrict access to servers and to define the required filters for those services. Almost every connection to or through the firewall will use the ACL to determine whether the connection is allowed and what the conditions of the connections are.

Secure Computing Corporation currently manufactures two firewall products: Sidewinder™ and BorderWare™ Firewall Server™ (BFS). Both Sidewinder and BorderWare have an ACL mechanism. On BFS, the ACL checks are performed in the kernel. The advantage of this is that each process can access the data even from its own chroot(2) area. Each process simply does a system call. There is no place in BFS' ACL system calls to block and the code required in the proxies/servers is easy to implement and is unobtrusive. The ACLs themselves, however, are very difficult for the user to understand. The end result is a nice mechanism that is difficult to use.

On Sidewinder there is a process called ACLd which resolves the ACL checks. In order to make the ACLs work properly, ACLd is a non-blocking process. Proxies must open a connection to ACLd, make the request, and come back later to get the result. Thus, the ACL part of the proxy code itself is more complex and pervasive. Further, ACLd can be a bottleneck since that one process is serving many other processes. Sidewinder can, however, support a much more flexible and comprehensive ACL system than is found on BFS.

What is needed is an ACL mechanism which provides quick access to the ACL mechanism while at the same time maintaining the complex functionality of the Sidewinder system.

In addition, although ACLs are a convenient, centrally located, way of storing access control rules, they do tend to become complex as the number of networks and users increase. This increased complexity makes them cumbersome and unwieldy to apply, and difficult to manage. Rules get out of date, often leaving dangerous access rules in place for users who no longer are supposed to have access to the system (e.g., ex-employees).

What is needed is a method of presenting and managing access control rules which can easily respond to changes in the number of networks and users.

SUMMARY OF THE INVENTION

The present invention is a system and method of implementing a security policy, comprising the steps of providing a plurality of access policies, defining a process and connecting the access policies and the process to form a security policy.

According to another aspect of the present invention, an access control mechanism is described in a computer network having a plurality of separate networks. The access control mechanism includes a plurality of regions, including a first and a second region, one or more services bridging said first and second region, access control rules which define a security policy, wherein the access control rules limit data transfer by the one or more services bridging the first and second regions, wherein the access control rules are defined as a decision tree, wherein the decision tree includes a decision node and a first and a second branch and wherein the decision node includes a true and a false destination path, wherein the true destination path leads to the first branch and the false destination path leads to the second branch and access control logic, wherein the access control logic operates with the access control rules to enforce the security policy.

According to yet another aspect of the present invention, a system and method for limiting transfers between networks comprises the steps of defining a to-from set, wherein the to-from set lists a source network and a destination network, associating the to-from set with the first service, defining a path, wherein the path includes desired options for limiting transfer from the source network to the destination network via the first service, storing information regarding the to-from set, the first service and the path as an access control rule, receiving a request to set up said first service between the source network and the destination network, comparing the request to the access control rule to determine access and, if access is allowed, establishing the service between the source and destination networks.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1A:
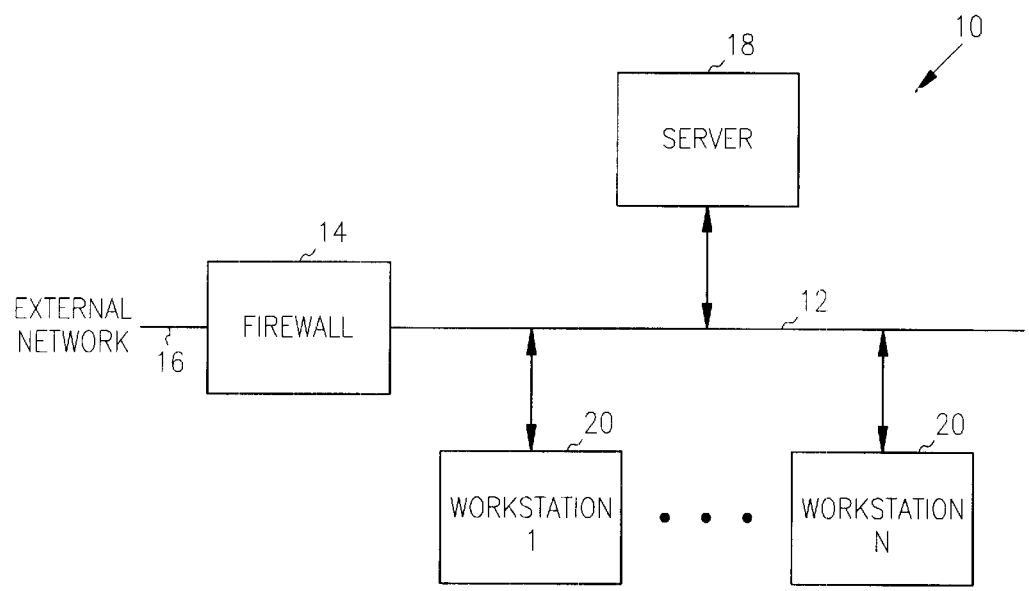
FIGS. 1a and 1b illustrate two representative firewall-protected computing systems.
Figure 1B:
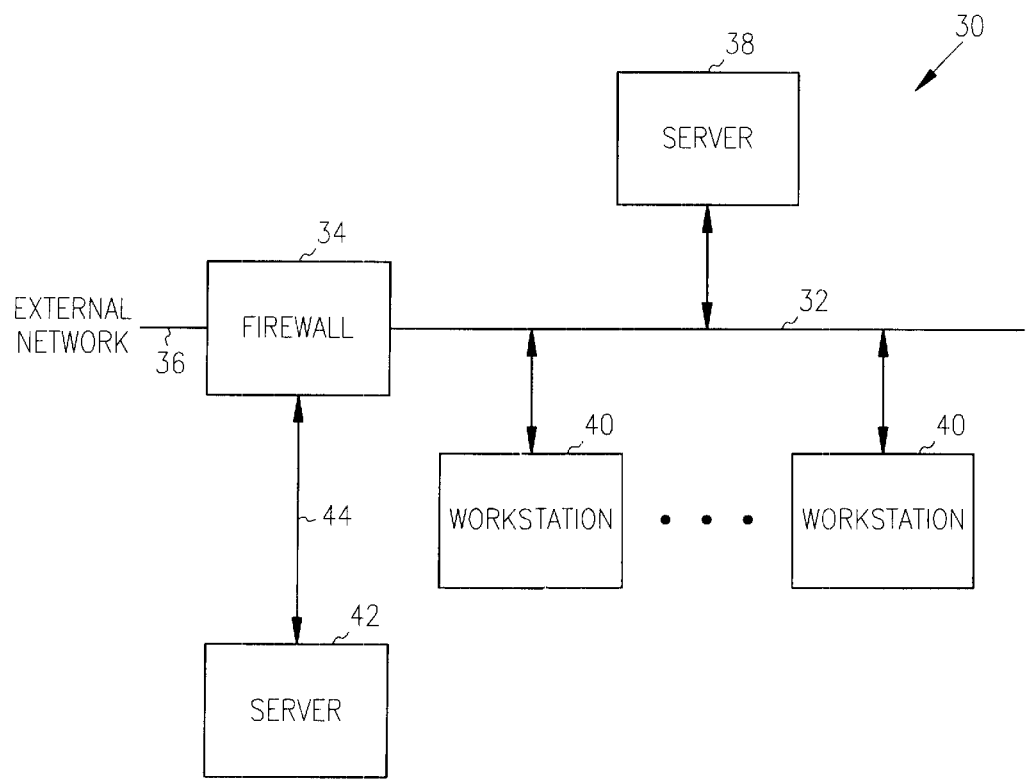

Two representative firewall-protected computing systems are shown in FIGS. 1a and 1b. System 10 in FIG. 1a includes an internal network 12 connected through firewall 14 to external network 16. A server 18 and one or more workstations 20 are connected to internal network 12 and communicate through firewall 14 with servers or workstations on external network 16.

System 30 in FIG. 1b includes an internal network 32 connected through firewall 34 to external network 36. A server 38 and one or more workstations 40 are connected to internal network 32. In addition, a server 42 is connected through network 44 to firewall 34. Workstations 40 communicate through firewall 14 with servers or workstations on external network 16 and with server 42 on network 44. In one embodiment network 44 and server 42 are in a demilitarized zone (DMZ) providing protected access to server 42 to internal users and to external entities.

In one embodiment, firewalls 14 and 34 implement a region-based security system as will be discussed below.

Regions are a new and flexible way of organizing systems such as systems 10 and 30. Regions let you group both physical interfaces (network cards) and Virtual Private Networks (VPNs) into areas of similar trust and security needs. Regions (along with services) provide the foundation on which every access rule is built. By grouping together networks and VPNs that require the same type of security, you eliminate the need to enter multiple versions of the same access rule for each network or VPN. In doing so, regions give you the flexibility to tailor a security policy that meets the specific needs of your network environment. A discussion of the use of regions to define a security policy is explained in greater detail by Reid et al. in "System and Method for Controlling Interactions Between Networks", U.S. Patent Application No. Xx/xxxxxx, filed herewith, which discussion is hereby incorporated by reference.

Figure 2:
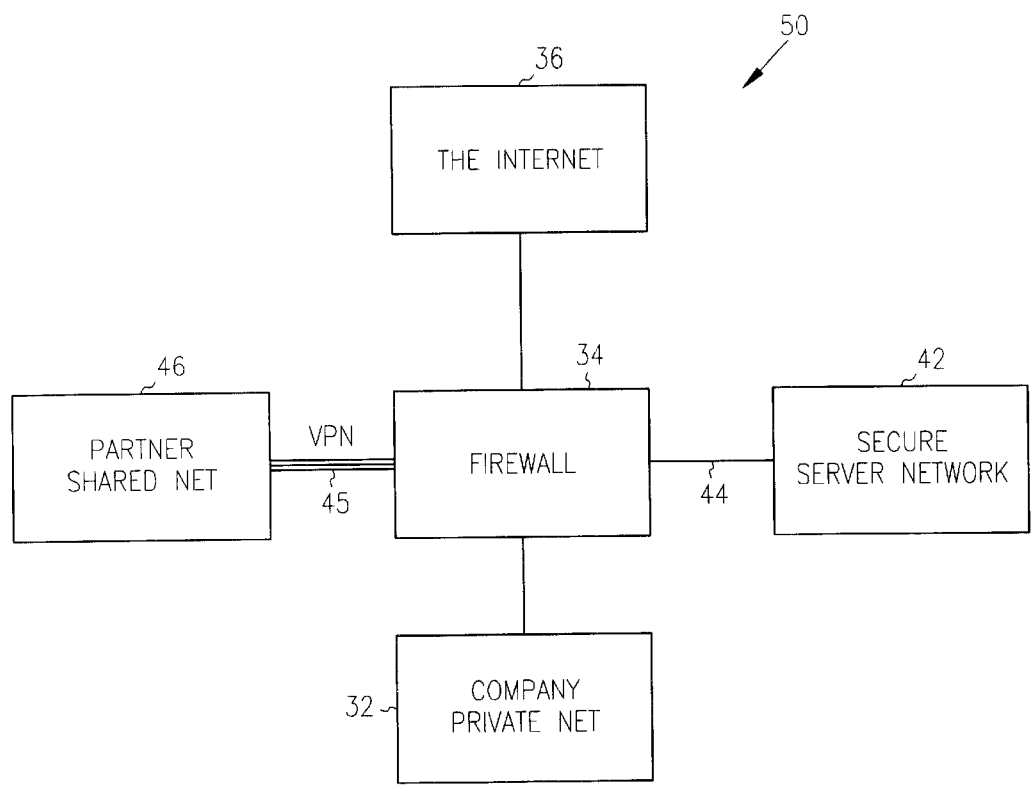
FIGS. 2 and 3 show other firewall-protected computing systems.
Figure 3:
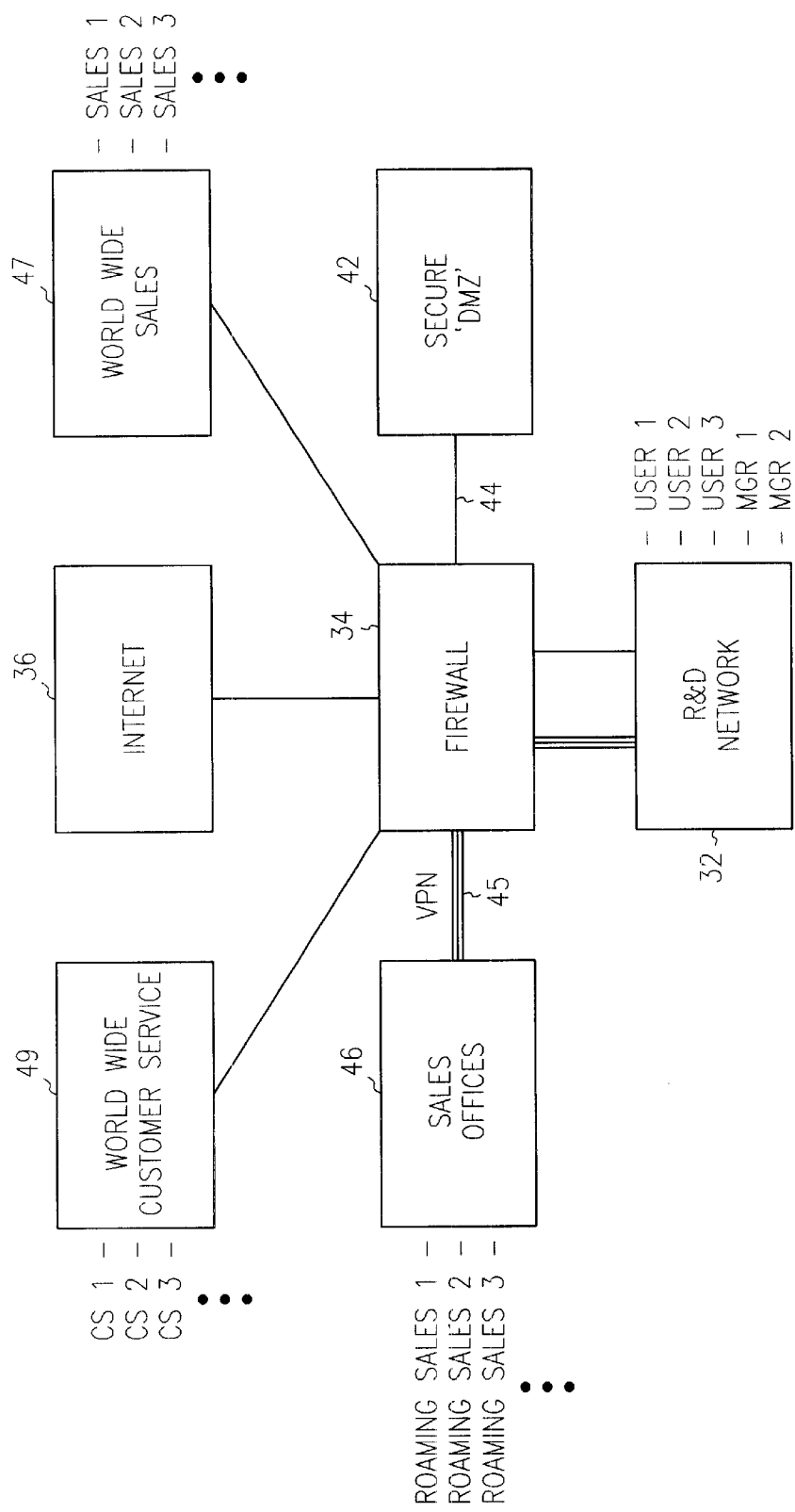

One embodiment of a region-based system is shown in FIG. 2. In FIG. 2, firewall 34 coordinates communication between internal network 32 (e.g., a company private network), external network 36 (e.g., the Internet) and DMZ network 44 (e.g., a secure server network). In one such embodiment, firewall 34 also controls virtual private network (VPN) communication between external entities and networks 32 and 44. Regions are defined and one or more networks is assigned to each region. In the example shown in FIG. 3, the regions are Sales Office, Worldwide Customer Service, Worldwide Sales, Secure 'DMZ' and R&D Network. R&D Network includes the trusted internal network. Sales Office and Secure 'DMZ' are within slightly less trusted regions. Worldwide Customer Service and Worldwide Sales come in unencrypted over the Internet and are, therefore, the least trusted.

Firewall 34 protects regions from unauthorized access through the use of access rules. For each connection attempt, the Firewall checks it against the defined access rules. The rule that matches the characteristics of the connection request is used to determine whether the connection should be allowed or denied.

ACLs are the heart and soul of firewall 34. For each connection attempt, the firewall checks the ACLs for permissions on use and for constraints for the connection. Constraints can include: encryption requirements, authentication requirements, time of day restrictions, concurrent sessions restrictions, connection redirection, address or host name restrictions, user restrictions and so forth.

In one embodiment, access rules are created in a completely new way—using decision trees. In such an embodiment, an access rule is based on a series of decisions made about a connection. Such an embodiment therefore lets you build an access rule based on "nodes" of decision criteria. You can add a node to check for such criteria as the time of day, whether the connection uses the appropriate authentication or encryption, the user or groups initiating the connection request or the IP address or host of the connection. Each node is compared against an incoming connection request and you determine whether the connection is allowed or denied based on the results of the node comparison. One such access rule decision tree is shown for illustration in FIG. 4.

Figure 4:
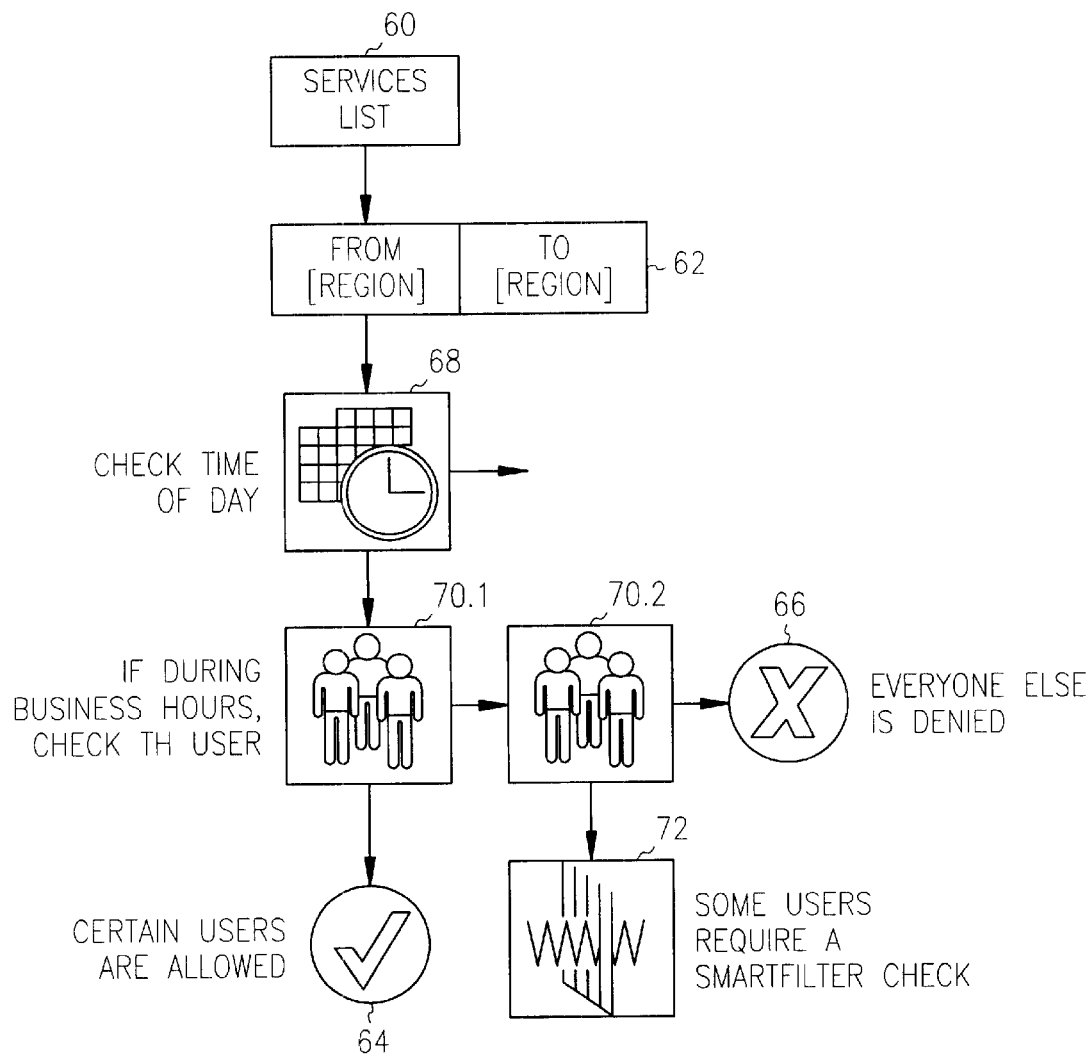
FIGS. 4 and 5 shows access control rules.

In FIG. 4, the access rule is shown as a decision tree with special kinds of nodes which make true or false decisions. Each decision leads to a branch which contains more nodes. Along the way, filters can be acquired. These filters are not processed by the kernel with the exception of redirects (rewrite destination address and/or port).

In one such embodiment, ACLs consist of all the required kernel code. This is all the code that implements the rules themselves in the kernel including: building, modifying, deleting, and querying the rules. Also included are the system calls that the user level programs need to use the ACLs. The parsing of the return values, especially the filters are not part of the ACLs themselves since the filter rules are defined dynamically by the programs issuing the system calls to build the ACLs. In such an embodiment, the kernel should be flexible enough to handle all the filter requirements without needing modifications for future enhancements.

As shown in FIG. 4, every access rule must consist of two specific nodes. The first, Services node 60, decides which service(s) the rule will control. The second, From/To node 62 determines the source region and destination region of the connection. Once you establish the services and regions for the rule, you then can add more nodes to determine specific details about the connection. The simplest access rule contains service node 60 and from/to node 62 and then a terminal node 64 or 66. (In the embodiment shown in FIG. 4, the terminal nodes are Allow 64 and Deny 66.)

The approach illustrated in FIG. 4 introduces a new way to control network access. The Firewall presents access rules as visual decision tree diagrams. Each diagram contains building blocks or nodes of information that apply a condition to or make a decision about the connection. At any point, you can add alerts to indicate when a particular point in an access rule has been reached or filters to check for authentication, encryption, WWW blocking or FTP commands.

In addition to the Allow or Deny terminal nodes, there are four other types of nodes you can add to an access rule: decision nodes, filter nodes, redirects and alerts. Decision nodes will be discussed next.

At any point in an access rule, you can check a connection request based on the time of day, its users and groups, its IP addresses and hosts or maximum concurrent sessions At these decision nodes, the Firewall determines whether the connection is true or false. If the connection meets the criteria listed in the node, the connection is considered true and proceeds along a "true" branch. If the connection does not meet the node criteria, the connection is considered false and proceeds along a "false" branch. Time of day decision node 68 and user/group decision node 70 are shown in FIG. 4.

You can apply a filter 72 at any point in an access rule. Filters differ from decision nodes in that they do not determine if a connection is true or false. Instead, filters attempt to apply a condition to the connection. If the filter can be applied to the connection, the filter is performed and the connection proceeds along the same path. If the filter does not apply to the connection, the filter is ignored and the connection still proceeds. In one embodiment, filter node 72 can force user authentication or encryption, can use filters to block particular WWW connections, or can filter the connection to see if it contains Java or ActiveX content.

A rewrite node is a point in an access rule where source or destination addresses are mapped to other source or destination addresses. Destination IP address rewrites allow an inbound connection through NAT address hiding to be remapped to a destination inside the NAT barrier. Source address rewrites can be used on outbound connections to make the source appear to be one of many external addresses. This process allows the internal hosts to be aliased to external addresses. In one embodiment, rewrites can be based on any connection criteria, including users.

At any point in an access rule, you can add an alert that notifies recipients when a connection has reached a particular point in an access rule. Using these alerts, you can monitor specific users, IP addresses and other criteria contained within a specific access rule.

When a connection request reaches a node in a rule, it is checked against the information in the node. If the connection is a filter node 72, the filter condition is either applied or ignored. Only one branch leads out of a filter node. If the node happens to be a decision node, there are two possible results. If the connection meets the criteria listed, it is considered true and follows the "true" branch of the access rule. Otherwise, the connection is considered "false" and follows the false branch.

In the example shown in FIG. 4, if at node 70.1, the connection was initiated by a user or group listed in this node, the connection proceeds down the true path. If the connection was not initiated by the users or groups listed, then the connection proceeds to the right along the false path. The concept of true and false branches allows you to tailor your access rule to be as simple or complex as you need.

Figure 5:
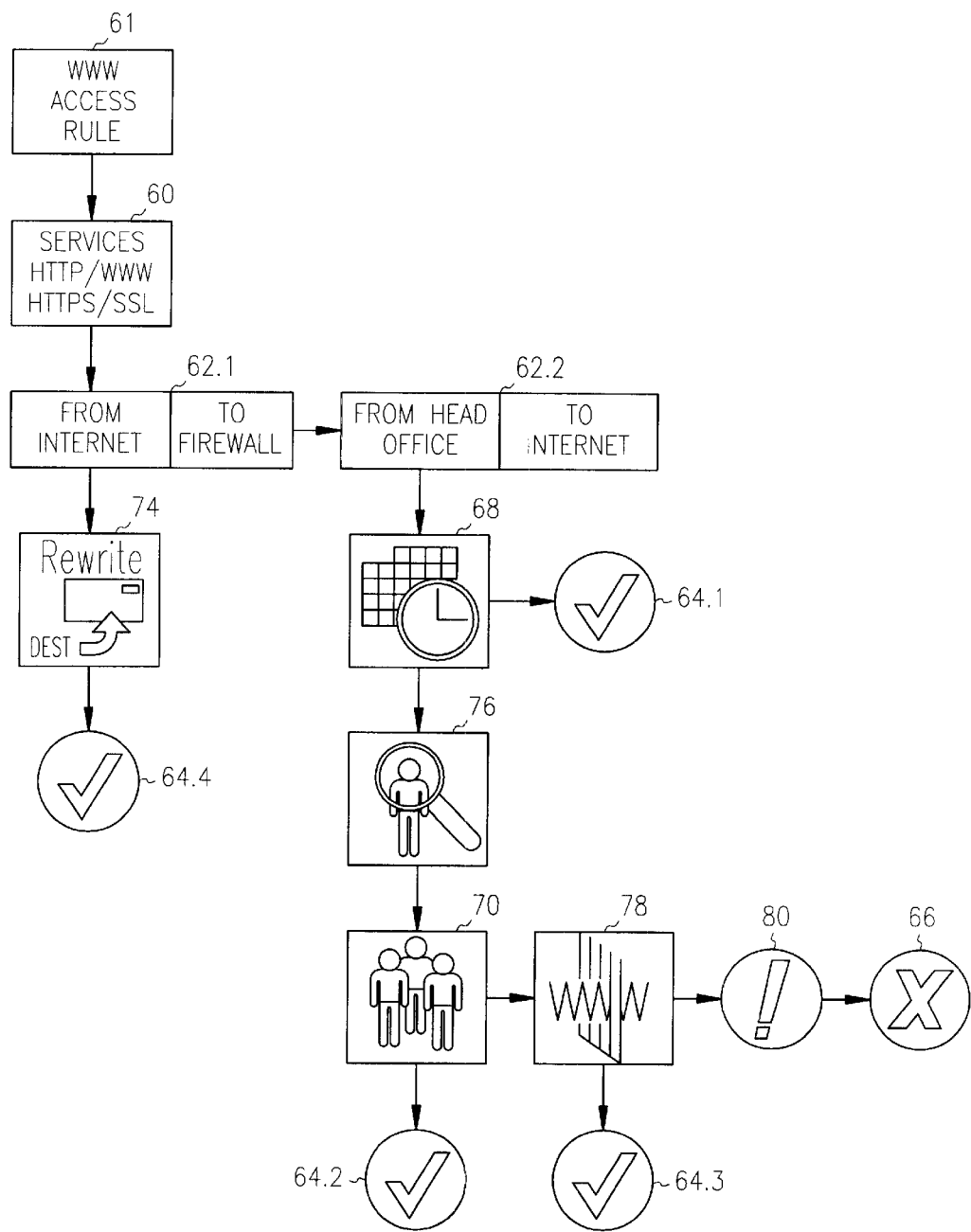

A more complex access control rule is shown graphically in FIG. 5. In FIG. 5, rule 61 manages HTTP and SSL connections over the Internet. Rule 61 shows from/to nodes 62.1 and 62.2. Node 62.1 defines what happens to traffic received from the Internet. Node 62.2 defines what happens to traffic directed from internal network 32 toward Internet 36.

If the traffic is received from Internet 36, the kernel applies rewrite node 74. In the example shown rewrite node 74 would, for instance, redirect connections to the public access servers on Secure Server Network 42.

For traffic destined for the Internet, a more complex rule is applied. At node 64, a check is made for time of day. One example would be to restrict outbound access to certain business hours. If the result is "TRUE" (e.g., access is only permitted during non-business hours and it is currently non-business hours), control moves to Allow node 64.1 and the access is allowed.

If, however, the check at node 64 is "FALSE", control moves to authentication node 76 and the user is authenticated. Authentication may be as simple as a password or could require, for example, the use of a token card. Control then moves to node 70, where a decision is made based on the authenticated user. In one example, if at 70 the authenticated user is determined to be management, control moves to node 64.2 and access is allowed. If, however, the result is "FALSE", control moves to node 78 and a check a URL blocking filter (such as SmartFilter from Secure Computing Corporation) is applied. If the results of the URL blocking filter are to allow access, control moves to node 64.3. If not, control moves to alert node 80 and an alert message is sent, for instance, to the System Administrator.

The ACLs described above combine the services themselves, the regions that the services bridge, and the access control decisions. The user draws a graph which starts with a service and a to-from set. Next, the user creates a path consisting of the desired options which can include: time, session counts, authentication, encryption, users/groups, WWW filters, ftp filters, email filters, destination address re-writes, to addresses and from addresses. The user is building a decision tree.

In the embodiment shown, some of the decision nodes in the tree have two paths from them to the next node (a true path and a false path) and some just have one path. The nodes that have one path are nodes which provide filtering, logging, or address rewrites. No decisions are made on filtering since filtering is performed in user level code. (For example, to make the implementation easier, the kernel will not try to implement SmartFilter. Instead, the result of the ACL check will be to provide a response which notes SmartFilter should be applied and supplies the categories which are to be blocked. The proxy will allow the connection provided that the SmartFilter check allows the connection.)

As noted above, in one embodiment each node in the decision tree can be one of two types of node. The first type is a decision node. The second type of node is a filter node.

A decision node is one where the decision regarding the action to perform is done in the kernel. To the user, on the GUI, it means that they can have a true branch and a false branch. This node is implemented in user space in the service itself.

A filter node is implemented in user space in the service itself. The service will ignore filters which do not apply to it. To the user, on the GUI, it means that they can only have a true branch. The false branch is always a deny service.

Decision Nodes

This section describes one embodiment of the decision nodes and their associated data structures. Also described are the system calls that will be available to work on the node. This design assumes that each ACL will consist of first a list of services, followed by some to/from region decisions, and then followed by anything else desired.

The scc_decision_node is a union structure that looks like this:

```
struct scc_decision_node {
    char *node_descriptor;
    loop_check;
    scc_decision_node *true_path;
    scc_decision_node *false_path;
    int reference_count;
    int node_has_been_deleted;
    int node_type;
    int debug_node;
    union {
        scc_user_rec user_struct;
        scc_addr_rec addr_struct;
        scc_counter_rec counter_struct;
        scc_decision_node *subrule_ptr;
        scc_date_rec date_struct;
        scc_filter_rec filter_struct;
        scc_log_rec log_struct;
        scc_rewrite_rec rewrite_struct;
        scc_mat_rec mat_struct;
    } detail_data;
}
``` node_type is one of:
define ACL_SERVICE_DECISION_NODE 0
define ACL_USER_DECISION_NODE 1
define ACL_ADDR_DECISION_NODE 2
define ACL_COUNTER_DECISION_NODE 3
define ACL_RULE_DECISION_NODE 4
define ACL_DATE_DECISION_NODE 5
define ACL_FILTER_NODE 6
define ACL_LOG_NODE 7
define ACL_REDIRECT_NODE 8
define ACL_PERMIT_SERVICE 9
define ACL_DENY_SERVICE 10
which describes which of the union pointers to use. And, in the case of the end of the path, the node_type indicates if a permit or deny is to be used.

Note that the subrule_ptr is to implement the rule within a rule requirement of the GUI.

If a decision to check is true, then the true_path is the next node to check. Similarly for a false decision.

The node_descriptor is a character string which describes this particular node. There is no set definition for this description so the backend is free to enumerate nodes as it wishes and the GUI/backend can use node descriptors to glue together messages from the audit stream to trace through what is happening in the decision process. Also we use the node descriptor as an index into a the node table. This table has as entries a pointer to each node for fast node lookup.

If a node is deleted, then the node_has_been_deleted flag is set. If at any point in a ACL check we come across such a node we issue a deny. We use the reference_count to determine if we actually delete the node. Only when the reference count is zero do we actually free up the memory.

The debug_node flag can be set to do various things as will be discussed below.

We use the loop_check flag to prevent loops in the ACLs causing us to recurse forever. We set this flag to true when we enter this node for checking and after checking the children to the end we reset the value to false. If while checking the children we encounter a loop flag set to true we know we have reached cycle in the tree.

Services node 60 and regions node 62 are special decision node which anchor the decision tree. This allows for quick indexing by service number. To do this, there will be an array of pointers (scc_service_array) indexed by the service number. The pointers point to and array of regions used by that service. There will be a variable max_service_number which the kernel will maintain to use as a guild line for indexing into the service array. Each entry in the scc_service_array will be a structure as follows:
struct scc_service_def {
    int number_regions;
    scc_service_rec **region_array;
    int reference_count;
    int node_has_been_deleted;
}
Each service should have a unique number but this will not be implemented in the kernel. Rather, the kernel will be given a service number and the kernel will allocate a bucket for that service. The kernel will be unconcerned about which service this bucket actually belongs to. Note that the scc_service_rec is not a part of the scc_decision_node listed above.

When we want to delete everything for an entire service (a user defined service for example), we check to see if all structures pointed at by the region array are empty. If not we mark this node as being deleted. The scc_service_recs pointed at by the region array will decrement the reference count as they get deleted (and freed) and when the reference count is zero this record is freed.
struct scc_service_rec {
    int number_regions;
    unsigned long total_sessions;
    unsigned long current_sessions;
    scc_decision_node *next_decision;
    char *node_descriptor;
    scc_service_def *parent_struct;
    int to_region;
    int from_region;
    int debug_node;
    int node_has_been_deleted;
}
When an ACL check is requested we use the service number to index into the table of services. This leads us to a scc_service_def structure. We index into the region_array using the to and from regions. If the entry has a value (i.e. the pointer is not NULL) and if the node_has_been_deleted flag is false, then this node is the start of a valid decision check. In this case, we use the scc_decision_node pointer to start traversing this tree. If no decision tree is found for this particular region-service combination, then the service is denied access.

We will keep track of sessions for each service-region combination so that other programs can check to see the status of traffic on the box (see Section 2.7 Other ACL Access for the system calls available). Thus, every time a success is returned, the counts here are increased and every time service de-registers, the proper counter, current_sessions, is decreased. The node_has_been_deleted is there for when the service record is to be deleted. In this case, processes will continue to decrement the current_sessions until all the counts are zero. At that time, the memory will be freed. When we can free this structure we go back to the parent structure and NULL the entry in its region_array. If all entries are null then free that structure if it is marked for deletion.

The user decision node is used to make decisions specific to users or groups of users. This structure is simple and goes like this:
struct scc_user_rec {
    char **sorted_user_array;
    int number_of_users;
}
If the user being checked is in the array of users, then the decision is true. If one of the groups that the user belongs to (also included in the system call) is in the array of users, then the decision is true. Note that users and groups are one and the same as far as the system goes. This means the GUI/backend must make sure that there is not a group called Andrew and a user called Andrew.

If no user name was provided for the ACL check and if user names are relevant to this protocol (i.e. the name_valid flag was set to true in the ACL call), then if the calling process does not provide a user name,
define ACL_NEED_USER_NAME 8
will be returned. The proxy would need to query for a user name and call again with that information.

The IP Addresses/Host Names decision node is used to make decisions that select for/against source or destination addresses or host names.

```
struct scc_addr_rec {
  int type;
  char **sorted_hostname_array;
  int number_of_names;
  radix tree of host numbers/network masks
}
```
Where type is either:
define ACL_ADDR_SRC_CHECK 0
define ACL_ADDR_DST_CHECK 1

The same structure is used for a source address check and a destination address check. Note that if the address/mask set does not contain the current address being examined and if sorted_hostname_array contains some data, then if the correct name was not provided in the ACL call to the kernel, the kernel will return the value:
define ACL_RESOLVE_SRC_ADDR 2
define ACL_RESOLVE_DST_ADDR 3
indicating which address needs to be resolved via a reverse DNS lookup. The ACL would then be called again with the resolved name.

Note that the list of host names must be in sorted order but the letters of the hostname must be reversed. For example, rafael.tor.securecomputing.com would be moc.gnitup-moceruces.rot.leafar. These are then put into sorted order. This allows the kernel to quickly process wild card entries. It is also important that unneeded entries are not loaded into the kernel. For example if the user has specified *.com, then no other entries of the form .com should be present in the list passed to the kernel.

The Maximum Concurrent Sessions decision node provides the ability to put a choke on the number of concurrent sessions on a service or group of services. We want to have the ability to program a counter to be shared among all the services on this path, or to have the counter count for each service individually.

The structure to handle this looks like this:
```
struct scc_count_rec {
  int service_specific_flag;
  unsigned long current_count;
  unsigned long max_count;
  unsigned long total_count;
  scc_detail_count_rec **service_counters;
  unsigned long num_services;
}
```
Where the service_specific_flag can have values:
define ACL_SHARE_COUNT 0
define ACL_INDIVID_COUNT 1
and if the service_specific_flag has value ACL_SHARE_COUNT, then the shared count record is used. Otherwise, the array is used. Note the size of the array is stored in num_services and the array is indexed as:
service_counters [service_number].

The scc_detail_count_rec is:
```
struct scc_detail_count_rec {
  int number_regions;
  unsigned long service_number;
  unsigned long *current_count;
  unsigned long *total_count;
  scc_decision_node *parent_record;
  int node_has_been_deleted;
}
```
where the current count tells how many connections that use this counter are currently active. The total count is the total number of connections that have used this counter. We use the max_count from the scc_count_rec to determine the max. Thus the max is a shared value that all individual counts must adhere to. The arrays in the scc_detail_count_rec are indexed as:
current_count[to_region][from_region].

Each time a detailed record is allocated the parent decision node's reference count is incremented.

The node_has_been_deleted tells a process that is going to decrement the counter whether this node is being used or not. If set to false, then the record is in use and increments or decrements are done accordingly. If set to true, then when the count gets decremented to zero, the memory is freed up and the parent's reference counter is decremented. If the parent has been deleted and if the reference counter is set to zero then the parent node is freed.

The node_has_been_deleted flag, in the detailed record, gets set to true (i.e. not zero) when the node itself goes away (the user has removed it from the diagram) or if the counter is switched from individual to shared service counts. Note that each counter is indexed by to region and from region so that the count is unique on a service-from region-to region triplet.

The parent_record pointer points back to the top level scc_decision_node. The service_number is there so that we can index into the service_counters array and set the array pointer to NULL when we are preparing to free up memory.

When the counter is switched from individual to shared service, then the records in the array are all invalidated. The totals of the counts of the array are added up as the new total_count for this node (in the parent record). In order to keep the counters correct, when we decrement a counter, check to see if the record has been deleted. If the record is marked as deleted and if the parent_record is set to shared, then decrement the shared counter as well. If the individual counter is now zero, free up the memory as above.

The Time/Date decision node provides the ability to use date and time as a means of restricting access to services. The structures look like this:
```
struct scc_date_rec {
  unsigned long number_details;
  scc_date_detail_rec *date_details;
}
struct scc_date_detail_rec {
  unsigned long start_seconds;
  unsigned long end_seconds;
}
```
The scc_date_rec is the top level structure and it has number_details separate date rules. Each of those rules are in a scc_date_detail_rec. So, we have an array of structures in scc_date_rec each of which has a start seconds and an end seconds value. Each value is relative to the beginning of Sunday. Thus, start second 0 and end second 1 would be allowing the connection only during the first second of Sunday.

The backend must provide the records in sorted order by start_second.

A time and date decision is based on a series of time rules. We simply check the current time and day against each rule. If we find a rule where the current time and day falls in that rule, then the decision is the true path otherwise it is the false path.

In one embodiment, to be a complete rule, a rule must consist of at least a Services node 60 and a Region node 62 and have all true and false branches terminated by terminal nodes 64 or 66. If you plan to use a segment of a particular rule in more than one rule, you can create a partial rule. Partial, or shared, rules can be added to any complete rule.

In one embodiment, complete or partial access rules can be configured using a graphical user interface such as is shown in FIGS. 4 and 5. In order to configure a complete or partial rule one must perform the following general steps:

1) decide if you want to create a complete or partial rule.
2) select the services this rule will control.
3) select the source region and destination region for the rule.
4) decide on a name for the rule.
5) decide what nodes you want to add to this rule.

The ability to create shared rule segments is built into the system as follows. A rule is simply a chain of decision nodes. After the chain of rules is completed, the decision path at the entry point to the sub-rule is taken based on the outcome of the rule. The filters and audit messages within the rule are still generated and accumulated.

Log nodes direct the kernel to log messages to the audit subsystem. The backend can fully specify the message to log. The structure is as follows:

struct scc_log_rec {
   char *audit_message;
   int audit_message_type;
}

The message will be of the form:
audit_printf (audit_message_type,
   AUDIT_A_AREA,
   AUDIT_T_NETACL,
   AUDIT_P_MAJOR,
   "%s from ACL log node: %s",
   node_descriptor,
   audit_message);

Note that an scc_log_node always takes the true path of the decision tree.

In one embodiment, filters are just strings which the proxy interprets to perform it's filtering. The kernel does none of the decision work. Instead, the kernel is given a pattern, and if the node is reached and if there is some data for the decision made at that node, then the pattern is accumulated as a filter. All of the filters are accumulated by the kernel, concatenated together and returned to the proxy as part of the system call. In such an embodiment, the kernel requires no work to implement filters beyond the re-writing of addresses.

A filter structure contains all the relevant filter data. The following shows the data and explains its use:

struct scc_filter_rec {
   char *filter_string;
   int filter_string_length;
}

If the filter_string_length is zero, then there are no filters otherwise, this filter string is appended to the array passed in, in the ACL call by the service.

The filters are as follows: encryption, authentication,

The encryption filter requires that a connection is encrypted with a certain level of encryption. It will be up to the user level process to verify that the requirements of the filter are met. If the requirements are not met the action is to deny the connection.

The authentication filter requires that a connection is authenticated. One or more possible methods of authentication can be specified. This would only apply to those protocols that allow for a user name as part of the protocol. Currently this would be: ftp, telnet, and WWW.

There are a number of possible WWW Filters. For instance, SmartFilter can be used as described above. In addition, a WWW filter may block Java or ActiveX scripts. In one embodiment the SmartFilter filter can also specify which policy to use (for sites that define multiple policies). These are performed by the caching WWW proxy only. One such embodiment also includes cookie blocking.

Likewise, there are a number of possible FTP Filters. These include filtering on: GET, PUT, PASV, PORT, MKDIR, RMDIR, RENAME, DELETE, SITE, filtering on file size and filtering anonymous ftp. All filtering must be done by the proxy or server.

Furthermore, there are a number of email filters required. This includes mail mapping and content blocking. Again the proxy/server must fulfil the requirements of the filter.

Redirect Nodes

Redirect nodes act like filters since they only have one path out of them. Redirects are tables which map source or destination addresses to other source or destination addresses. Currently we only map destination addresses. The most obvious use of redirects are to map connections coming into the firewall from the insecure side of a NAT region pair to a secure machine. In this case, the connecting host cannot see the hosts behind the firewall. The redirects will map a connection coming to a given firewall address (could be one of many because of MAT) to the desired secure host. The kernel will only accept addresses (the UI can accept names providing it translates them to an address). The tables, whose structure is described below, will contain an entry for each MAT address that applies.

Another use of redirects is to map an address going from a region which can see all the hosts in the destination region. In this case, the redirect has only one entry which maps the address and port to the given address and port.

The final case is one where we might not know which of the above two apply. In that case, all possible MAT addresses might be present and a global rule in the case that the connection is not to the Firewall itself, is also present. This final case happens when you are using a redirect from a rule within a rule.

The structure for the redirect table is as follows:

struct scc_rewrite_rec {
   int node_type;
   int no_match_flag;
   int num_table_entries;
   scc_rewrite_rule *rewrite_rules;
}
struct scc_rewrite_rule {
   struct sockaddr_in check_addr; /* including port */
   struct sockaddr_in netmask; /* netmask used for checking */
   struct sockaddr_in new_addr; /* including port */
}

The node_type is one of:
ACL_SRC_REWRITE_NODE
ACL_DST_REWRITE_NODE

Since the number of addresses to check against are minimal, we will leave the addresses in unsorted order.

The redirect mapping goes as follows:

1. See if there is an address/port which matches the current connection. A port number of 0 means any port and an address of 0.0.0.0 means any address.
2. If there is a matching address or port, to rewrite the addresses.
3. If there is no match address then if the no_match_flag is set to ACL_REWRITE_NO_MATCH_DENY then deny the connection. Otherwise leave the port and address unchanged.

Note that if there are multiple redirect boxes on the path that allows a successful connection, then the one closest to the check mark has priority. Note also that those rules which do not change a value, I.e. if there is a rule which says for any address map port x to port y, then the address is not considered to be mapped and thus a redirect box further away from the check mark could rewrite that address (but not the port). If there is a rule further away which re maps the address and the port then that rule does not apply.

One embodiment supports netmasks in the kernel. Such an embodiment masks the address to check with the netmask and check to see if it is the same as the check_addr. If so (and providing there is a port match) we have a match. Thus the check_addr and the netmask must match.

MAT Nodes

These are nodes that handle MAT address on a single region interface. The GUI system allows the user to configure different behaviors depending on which address the connection came to the firewall on. To handle this the backend needs to put a MAT node as the node the service points to for those regions that have MATs. For example, if the user enables a service From "region 1" to To "Firewall via address a", then a MAT node is needed. We only need MAT nodes for the firewall region provided that MAT has been defined for the firewall in that region.

If an ACL check comes to a MAT node and if the destination address is not found in the list of addresses then the connection is denied.

The structure used is:
struct scc_mat_rec {
    int num_mat_addrs;
    struct sockaddr_in *mat_addrs;
    scc_decision_node **next_node;
};

Decision Node Hashing

In one embodiment, there is a hash table that stores pointers to the decision nodes. The hash table consists of pointers to linked lists. The string is hashed to a bucket in the table and each bucket is the start of a linked list. A node when added to the table, the table is checked to see if the name is unique by looking at the string in the linked list that the string hashes to. If it is unique, then the node is added to the front of the hash table and if the node is already present, an EEXIST error is returned.

The hashing algorithm used is the sum of the characters in the name modulo the size of the table. Currently the table is static in size and is set to ACL_HASH_TABLE_SIZE (i.e. 200 buckets).

All initialization is done using the scc_hash_init function which is called by scc_acl_init. The size of the hash table is stored in scc_d_node_hash_size and the table itself is stored in scc_d_node_table.

Keeping Counters Consistent

Counters need to be kept consistent (i.e. correct) even when a process that holds a connection dies. There are several ways to do this. The current approach is to use the proc structure of the process making the system call. A new field will be added to keep track of each counter used by that process and the number of concurrent uses of the counter. When the process dies, then the exit1 code in the kernel will go through and clear the counters and free the proc space.

In order to make sure that memory is not freed before a process is finished with it, we have a node_has_been_deleted flag. This flag is part of every counter and is set to true (i.e. not zero) if the counter is no longer in use and zero otherwise. If a process decrements a current count to zero and if the flag is set to true, then the memory is freed since no process is using that memory. If a flag is set to true and the current count is already zero, then the memory is freed up immediately.

The following describes one embodiment of the proc structure entry for the counters. First, we have a linked list of counters based on a connection. The entry in the proc structure is: scc_ACL_cell *scc_ACL_head; Each cell in this linked list is as follows:
struct scc_ACL_cell {
    scc_ACL_cell *next;
    scc_ACL_cell *prev;
    scc_service_rec *service_record;
    int number_of_counters;
    int *counter_type; /* shared or otherwise */
    void **counter_rec;
}

The connection id passed back to the proxy will be the actual pointer to the scc_ACL_cell. Thus when the proxy does its free, we can very easily free up the counter space, free the memory, and re-attach the linked list of connection information.

When a process exits, we check the linked list of ACL rules and free up any that are still in use by the process.

When a new process starts up, we set the scc_ACL_head to NULL. When a process forks, the child's scc_ACL_head is set to NULL.

In The Proxy

The proxy will make two calls to the ACLs. The first call is:
int scc_is_service_allowed (
    unsigned long service_number,
    struct sockaddr_in *src_ip,
    struct sockaddr_in *dst_ip,
    char *src_host_name, /* usually null */
    char *dst_host_name, /* usually null */
    char *user_name, /* null if none */
    int name_valid, /* tell if name is valid */
    /* return values */
    int &to_region;
    int &from_region;
    int &filter_text_len,
    char &filter_text,
    int rule_name_len,
    char &rule_name,
    struct sockaddr_in &redirect_src_addr_port,
    struct sockaddr_in &redirect_dst_addr_port,
    int &master_key,
    caddr_t &connection_id /* id for this connection */
);
The possible return values are:
define ACL_DENY 0
define ACL_ALLOW_HIDE_SRC 1
define ACL_ALLOW_HIDE_DST 2
define ACL_ALLOW_HIDE_BOTH 3
define ACL_ALLOW_SHOW_ALL 4
define ACL_RESOLVE_SRC_ADDR 5
define ACL_RESOLVE_DST_ADDR 6
define ACL_NEED_MORE_FILTER_SPACE 7
define ACL_NEED_USER_NAME 8

Thus the ACLs will return, for each connection, how to hide the addresses.

The description of each of these values is as follows:

service_number: this is a number that the backend decides and is unique per service or possibly per service, from and to region triplet as desired.

src_ip: this is the source IP address of the connection.

dst_ip: this is the destination IP address of the connection.

src_host_name: this is the host name based on the reverse lookup of the source address of the connection. This is generally only used when the kernel explicitly asks for it by returning from a previous call to ssc_is_service_allowed with a return value of ACL_RESOLVE_SRC_ADDR.

dst_host_name: this is the host name based on the reverse lookup of the destination address of the connection. This is generally only used when the kernel explicitly asks for it by returning from a previous call to scc_is_service_allowed with a return value of ACL_RESOLVE_DST_ADDR.

user_name: this is the user name of the person using the service. This value is only used when ACL_NEED_USER_NAME has been returned by the kernel. Use NULL, if the name has not yet been requested. Currently only FTP, telnet and WWW support user names.

name_valid: this tells the ACLs whether or not a user name makes any sense for this protocol. If the name_valid flag is set to TRUE, then user decision nodes will be used (and thus a user name will be required if a user decision node is encountered when checking the ACL). If set to false, then the user decision nodes will be ignored and the true path of those nodes encountered when checking the ACL will be used.

to_region: the region number that the destination address of this connection is in.

from_region: the region number that the source address of this connection is in.

filter_text_len: this is a pointer to an integer which has the length of the filter_text array in it. This value will be set to the amount of data returned by the access call on return. If the return value is ACL_NEED_MORE_FILTER_SPACE, then the value in this variable will contain the amount of space required.

filter_text: this is an array of characters of size filter_text_len which will be used to store the concatenated filter strings accumulated while checking the ACLs.

rule_name_len: this is the size of the array rule_name.

rule_name: this is the name of the rule that allowed or denied the connection. Only a maximum of rule_name_len—1 characters will be stored in there.

redirect_dst_addr_port: this is the address and port to redirect this connection to. The system will set this to all zeroes if it is not in use. The port and address will always both be set together in this structure if it is to be used. Only the sin_port and sin_addr part of the structure will be used.

redirect_src_addr_port: this is used to indicate to the firewall that when making the connection from the firewall to the destination, it should use the source address/port provided. Note that unlike the redirect_dst_addr_port field only the parts of the address required will be filled out. In particular, if the port is specified but not the address then the address field will be zero. Similarly, if the address is specified but not the port, then the port will be zero. For the redirect_dst_addr_port, if one or both field are specified then they are both returned (with the unspecified field left the same as the actual destination).

master_key: this is the key that indicates which items have been licensed on the firewall.

connection_id: this is the connection id for this connection. When the service is finished you provide this id to the scc_service_done system call and that function decrements the correct counters.

Note that the user name will be used by the system to get the groups automatically behind the scenes in the library call. This means that the actual call to the kernel will have more fields. In particular, there will be a list of group names and a counter to indicate how many elements are in the list.

The second call will be:

int scc_service_done(caddr_t connection_id);

This call always returns zero now. The kernel will use the information in the proc structure for this process to decrement the connection counts for this connection.

There is one other call that a proxy might have to make. When an ACL is updated, proxies have to recheck their connections to see if they can still make the connection. This is done as follows:

int scc_recheck_service (
    unsigned long service_number,
    struct sockaddr_in *src_ip,
    struct sockaddr_in *dst_ip,
    char *src_host_name, /* usually null */
    char *dst_host_name, /* usually null */
    char *user_name, /* null if none */
    int name_valid, /* tell if name is valid */
    caddr_t &connection_id /* id for this connection */
    /* return values */
    int &to_region;
    int &from_region;
    int &filter_text_len;
    char &filter_text,
    int rule_name_len,
    char &rule_name,
    struct sockaddr_in &redirect_src_addr_port,
    struct sockaddr_in &redirect_dst_addr_port,
    int &master_key
    );

Returns from this will be the same as for the scc_is_service_allowed call except that connection_id is passed in as a parameter not a return value.

If the connection is not allowed, then the counters are automatically freed up and the proxy need not make any further calls for that connection. In the case of counter nodes, the recheck will fail until the counter is at an acceptable level. This means that, if the counter has been decreased below current connection levels, the first connection rechecked will fail and so on until the current number of connections counter has been decremented enough. Thus, proxies should recheck services in order of lowest priority to highest priority (typically by checking the oldest sessions first, when that is possible). Note that short-lived proxies and servers started by secured cannot guarantee the order in which ACLs will be rechecked, since they will all get a HUP signal at the same time.

In The Backend

In one embodiment, the backend is able to add, change, delete decision nodes. It also is able to insert new nodes into the tree. In such an embodiment, the following functions are provided to allow this to be done efficiently. All backend calls return 0 for success and −1 for failure. Later, errno will be used to determine what went wrong.

The Adding New and Updating Nodes call is used to add or update a node. The same call is used to add a new node or update a node. If the node_descriptor is unique, then it is a new node, otherwise update the node. In both cases, the values must all be completely filled out.

```
int scc_set_user_node (
    char *node_descriptor,
    char **sorted_user_array,
    int number_of_users,
    char *true_child_node_descriptor,
    char *false_child_node_descriptor);
int scc_set_host_node (
    char *node_descriptor,
    int type, /* src or dst check */
    char **sorted_hostname_array, /* see below */
    int number_of_names,
    struct sockaddr_in *ip_addr, /* array of structs of ip addrs */
    struct sockaddr_in *ip_mask, /* array of structs of ip masks */
    int number_of_ip,
    char *true_child_node_descriptor,
    char *false_child_node_descriptor);
```

Note that the list of host names must be in sorted order but the letters of the hostname must be reversed. For example, rafael.tor.securecomputing.com would be moc.gnitup-moceruces.rot.leafar. These are then put into sorted order. This allows the kernel to quickly process wild card entries. It is also important that unneeded entries are not loaded into the kernel. For example if the user has specified *. com, then no other entries of the form .com should be present in the list passed to the kernel.

```
int scc_set_count_node (
    char *node_descriptor,
    int service_specific_flag, /* share or not */
    int max_count,
    char *true_child_node_descriptor,
    char *false_child_node_descriptor);
int scc_set_time_node (
    char *node_descriptor,
    scc_date_detail_rec *date_entries,
    int number_date_entries,
    char *true_child_node_descriptor,
    char *false_child_node_descriptor);
```

Note that the date records must be in sorted order using start_seconds as the key to sort on. Note also that the date_entries field is an array of structs.

```
int scc_set_filter_node (
    char *node_descriptor,
    char *filter_string, /* list of filters */
    unsigned long filter_string_length,
    char *child_node_descriptor);
int scc_set_log_node (
    char *node_descriptor,
    int audit_message_type, /* category of audit call */
    char *log_message, /* message to output */
    char *child_node_descriptor);
int scc_set_rewrite_node (
    char *node_descriptor,
    int src_dst_flag,
    int no_match_action,
    int number_of_rewrite_rules,
    scc_rewrite_rule *rewrite_rules,
    char *child_node_descriptor);
int scc_set_subrule_node (
    char *node_descriptor,
    char *subrule_head_descriptor, /* start of subrule */
    char *true_child_node_descriptor,
    char *false_child_node_descriptor, /* NULL for service_rec */
);
int scc_set_mat_node (
    int num_mat_addrs,
    struct sockaddr_in *mat_addrs, /* array of structs */
    char **node_descriptors);
```

Note that for the scc_set_mat_node system call, the two arrays must be in sync (i.e. the first MAT address uses the first decision node in the node descriptors array).

Return values from these are as follows:

EEXIST: there is already a node with this node_descriptor and it is different from the node required for the system call.

ENOMEM: happens when the kernel is out of memory.

ENOENT: happens when the node descriptor specified does not exist.

EINVAL: happens when an invalid argument is provided to a system call. One example is if a NULL true_child_node_descriptor is passed in as an argument.

```
int scc_set_service_node (
    unsigned long servic_number, /* made up by backend */
    int to_region,
    int from_region,
    char *node_descriptor,
    int node_debug,
    char *child_node_descriptor);
```

The service nodes are different from the other nodes. The reference is the service number not the node descriptor. The node descriptor is there for audit purposes and should be the name of the ACL rule. If a debug value is set here then debugging is turned on recursively down the tree.

For all nodes, the descriptor to use for the allow terminating node is the string _SCC_ALLOW. For the deny connection terminating node, use the string _SCC_DENY.

Linking Nodes

Nodes are linked in the same system call that they are built or updated from. Those nodes which only have one path through them only have one potential node leaving them. A child node can either be, a descriptor of an existing node, the string _SCC_ALLOW, or the string _SCC_DENY. _SCC_ALLOW and _SCC_DENY are the accept and deny terminals of the tree respectively and otherwise the child is another scc_decision_node.

If the child node desired does not exist the system will return an error.

Deleting Nodes

If you want to delete a node you use:

int scc_delete_node(char *node_descriptor);

for all nodes except service nodes. For service nodes you use:

```
int scc_delete_service (
    int service_number,
    int to_region,
    int from_region);
```

Note that this will mark the node as deleted. You must still rebuild the tree. If an ACL is checked and a deleted node is encountered then the ACL will be denied.

Also, the system will only delete nodes when the reference count to that node is zero. All deleted nodes will be removed from the decision node table when the system call is made though.

If you want to delete the service from all regions, then set the source and destination regions to −1;

Debugging Nodes

You can set the debug value of a node (debug_node field in the scc_decision_node structure) by ORing bits. The possible values are:
define SCC_ACL_DEBUG_TRUE 0×1
define SCC_ACL_DEBUG_FALSE 0×2
define SCC_ACL_DEBUG_TIME 0×4

If the SCC_ACL_DEBUG_TRUE bit is set, then print a debug message when a true decision is reached at this node of the form:
audit_printf (
   AUDIT_F_KERN_ACL,
   AUDIT_A_AREA,
   AUDIT_T_DEBUG,
   AUDIT_P_MINOR,
   "ACL node: %s returned true.",
   d_node→node_descriptor);

If the SCC_ACL_DEBUG_FALSE bit is set, then print a debug message when a false decision is reached at this node of the form:
audit_printf (
   AUDIT_F_KERN_ACL,
   AUDIT_A_AREA,
   AUDIT_T_DEBUG,
   AUDIT_P_MINOR,
   "ACL node: %s returned false.",
   d_node→node_descriptor);

If the SCC_ACL_DEBUG_TIME bit is set, then print a debug message telling how much time was spent in this node in the form:
audit_printf (
   AUDIT_F_KERN_ACL,
   AUDIT _A_AREA,
   AUDIT_T_DEBUG,
   AUDIT_P_MINOR,
   "\n\nNode \"%s\ "took %ld seconds and %ld microseconds†n"
   "Children took %ld seconds and %ld microseconds.\n",
   d_node→node_descriptor,
   end.tv_sec, end.tv_usec, end_sub.tv_sec,
end_sub.tv_usec);
This will include all the time spent in subnodes as well.

You can set the debugging value of a node using a separate system call:
int scc_set_debug (
   char *node_descriptor,
   int debug_value);
For service nodes you should set the debug value in the set system call. Use the same possible values as above.

Service Usage Statistics

In one embodiment, the ACLs keep track of service counts for all services that use them. The counts are by service number, from region, to region triplet. Because we do not know before hand how many services there will be we implement this function in a two call method. A system call which could be used is as follows:

int scc_get_service_counts (
   int calltype
   int *count_size,
   struct scc_serv_count *counts);
The calltype can be one of:
define SCC_GET_NUM 0
define SCC_GET_VALS 1

When called with calltype=3D=3D SCC_GET_NUM, this system call sets the value of count_size to be the number of elements that need to be allocated in the counts array;

When called with call type=3D=3D SCC_GET_VALS, this system call sets the entries in the counts array to the appropriate values. If for some reason the number of elements in the array counts, passed in count_size is not big enough, then the call returns with ENOSPC and passes the new number required back in count_size. Even if there is enough space, we return in count_size the number of array elements used.

Each entry in the counts array is defined as follows:
typedef struct {
   unsigned long serv; /* service number */
   int from; /* from region */
   int to; /* to region */
   unsigned long total_sessions; /* since last reboot */
   unsigned long current_sessions; /* current active */
}scc_serv_count;

Building the Decision Tree

Figure 6A:
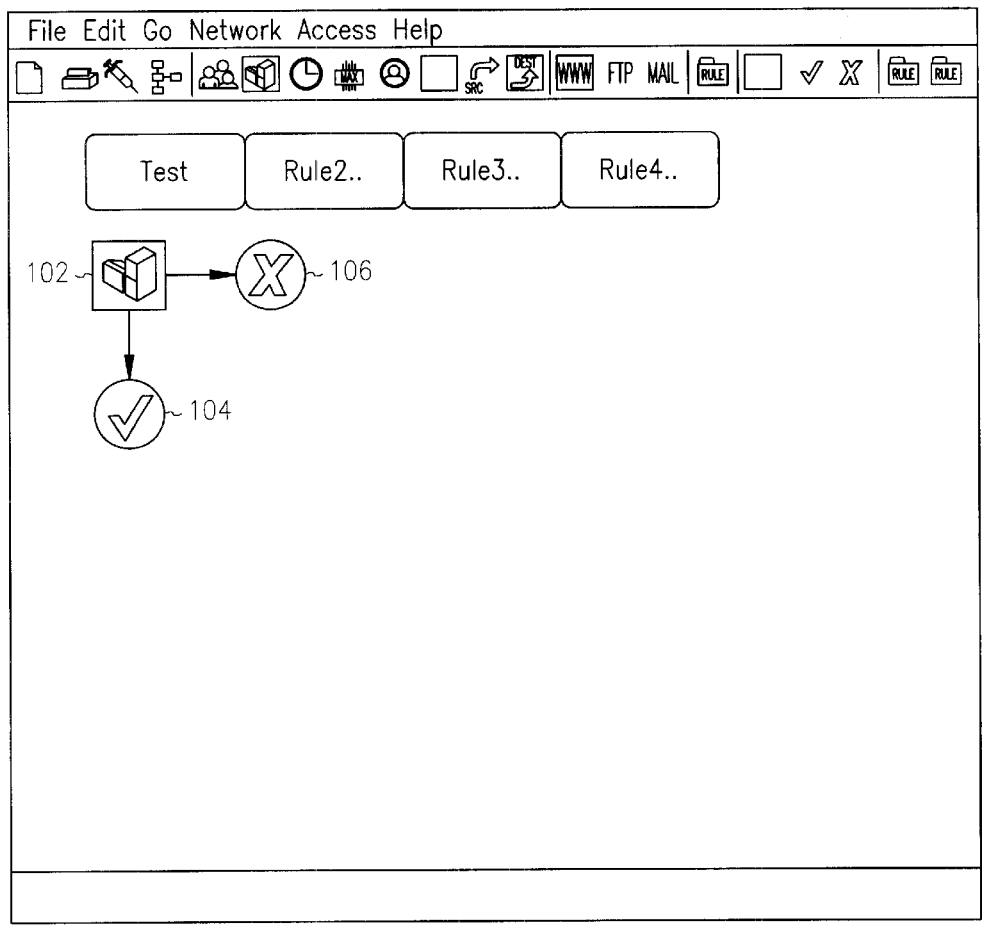
FIGS. 6a–6d, 7 and 8 show how an access control rule is built in an graphical user interface (GUI) system.

An example of how a decision tree could be built in a graphical environment is shown in FIGS. 6a–6d. In FIG. 6a, square icon 102 is a decision node which checks a connection request to determine if the request is accessing permitted IP addresses or hosts. If so, control moves to Allow node 104. If not, control moves to Deny node 106.

Figure 6B:
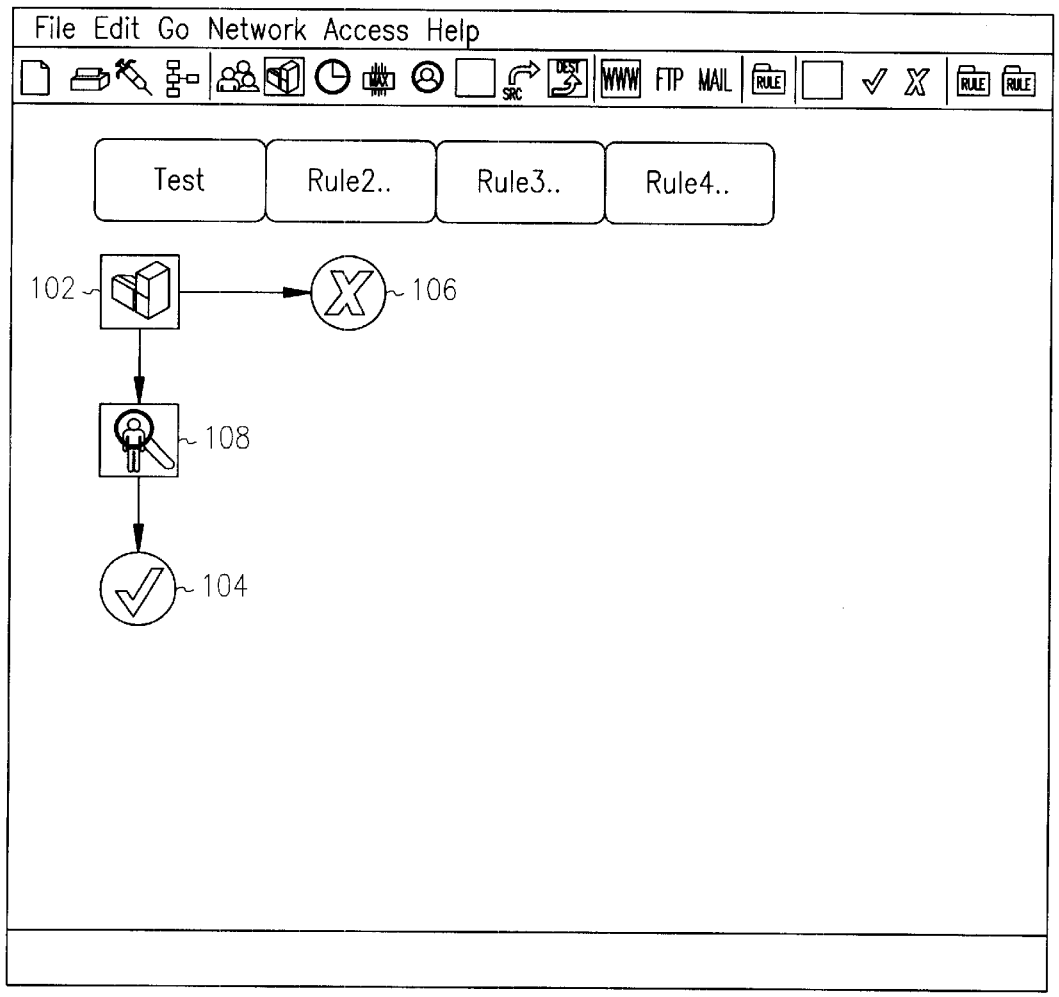

At FIG. 6b, the system administrator adds user authentication filter 108 to the "TRUE" path from node 102. In the embodiment discussed above, this will cause the kernel to return a conditional allowance which will require the proxy to perform the level of user authentication required by filter 108.

Figure 6C:
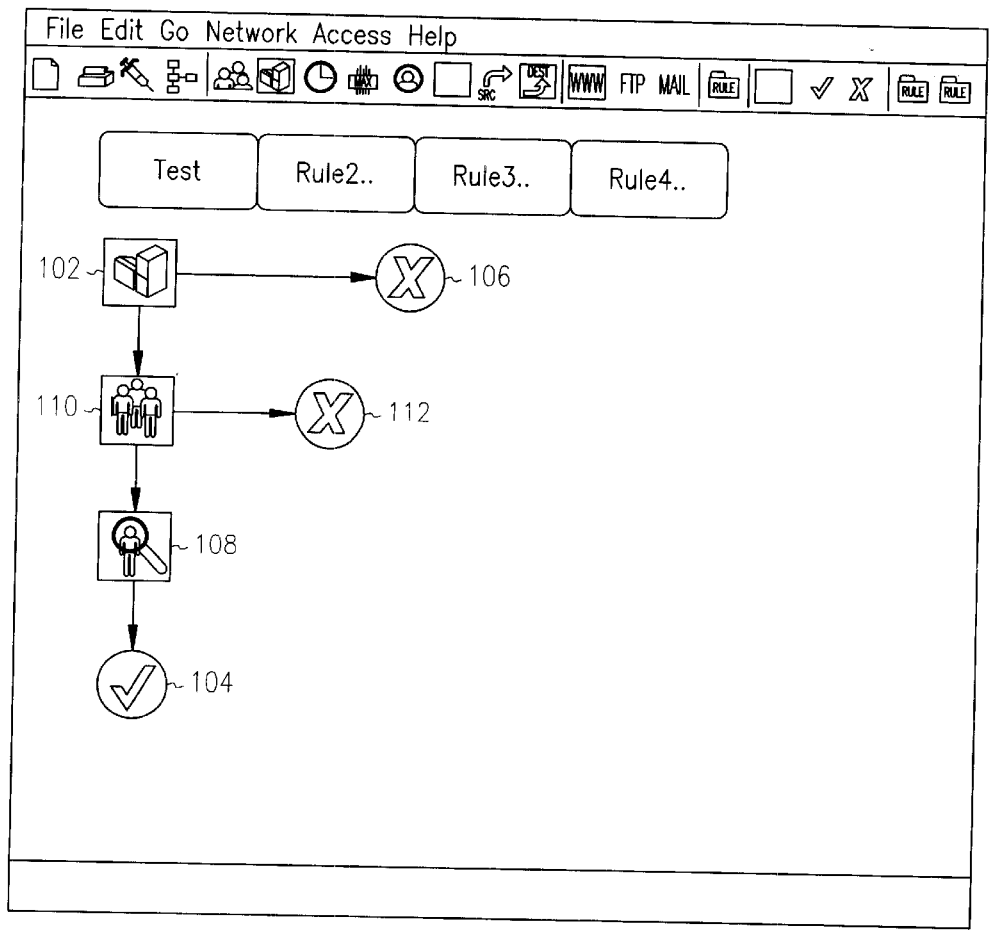

At FIG. 6c, a user/group decision node 110 is added between the IP address check and the user authentication check. The access rule will therefore execute in that order. Failure of the connection request to meet the required user/group decision criteria leads to Deny node 112.

Figure 6D:
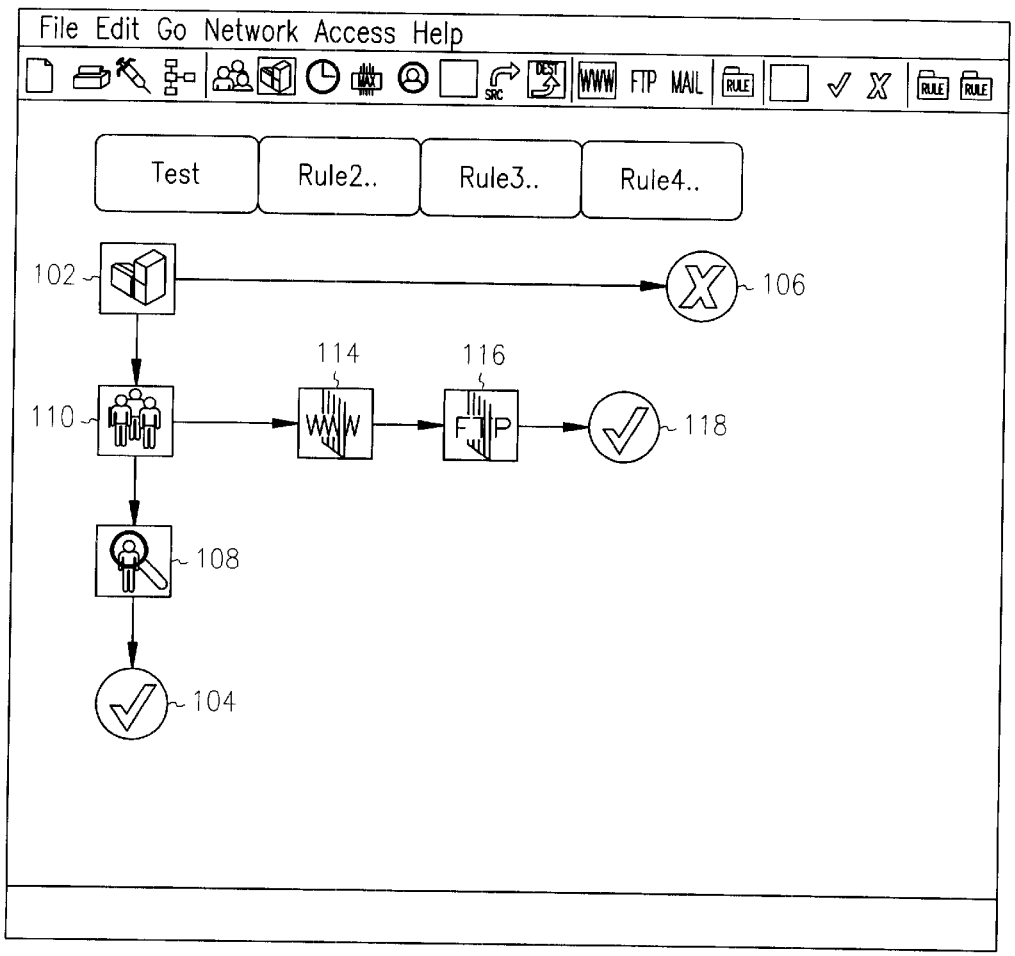

At FIG. 6d, SmartFilter filter 114 and FTP filter 116 replace Deny node 112 in FIG. 6c. In this case, if the criteria required by filters 114 and 116 are met by the connection request, the connection is allowed at Allow node 118. Otherwise the connection which traces down this path is denied.

Figure 7:
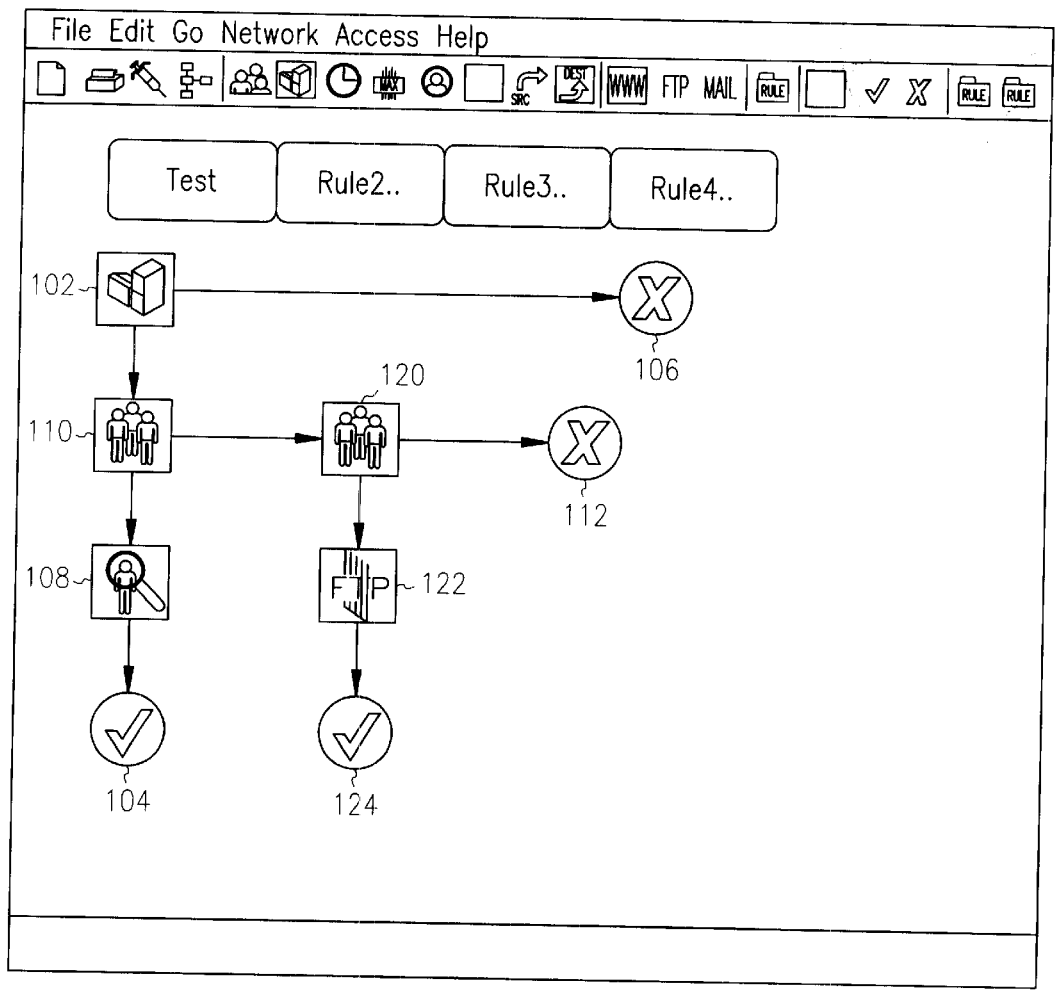

Another access control rule embodiment is shown in FIG. 7. In FIG. 7, a second user/group decision node 120 is placed between node 110 and Deny node 112. Now, instead of always denying based on a "FALSE" out of node 110, a second user/group check is made. If the decision at node 120 is "TRUE", an FTP filter 122 is returned to the proxy and, if the FTP filter permits, the connection is allowed. If, however, the decision at node 120 is "FALSE", control moves to Deny node 112 and the connection is denied.

Figure 8:
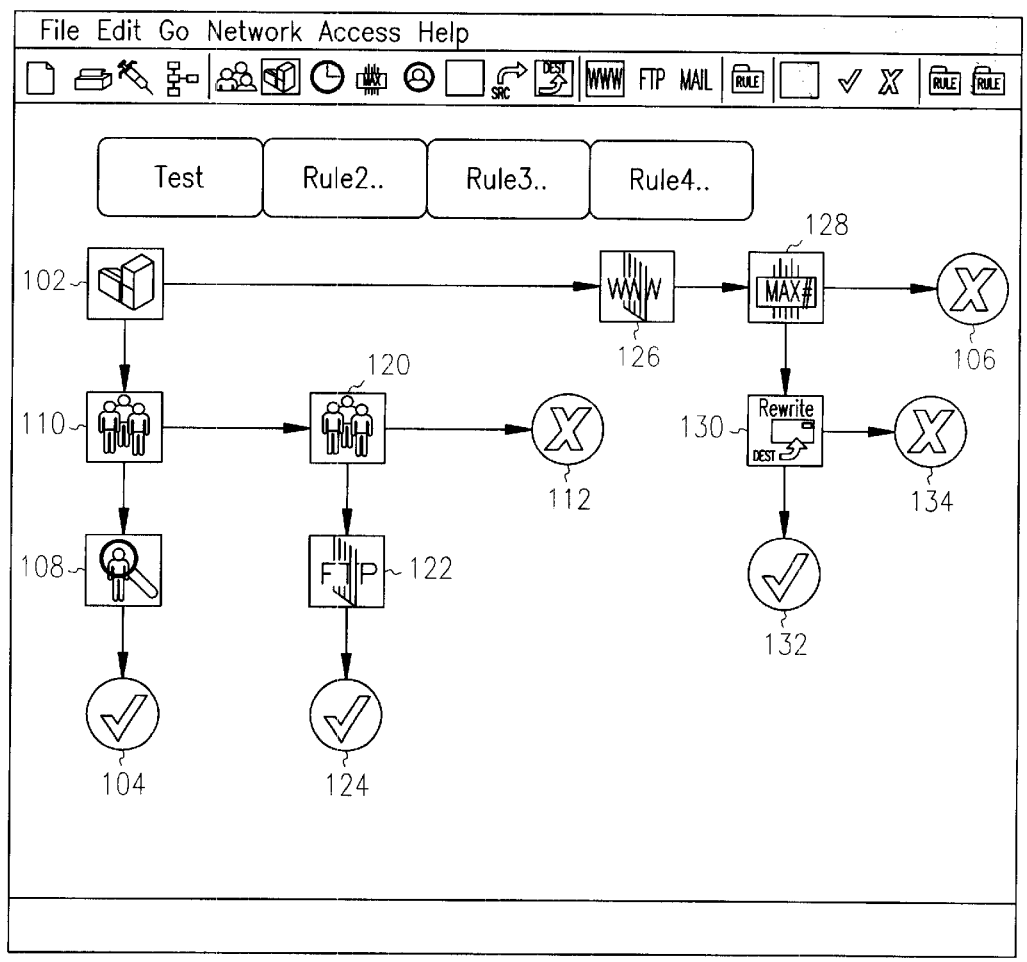

Yet another access control rule embodiment is shown in FIG. 8. In FIG. 8, the access control rule of FIG. 7 is further embelished to add additional checking to the "FALSE" path leading out of decision node 102. Now, instead of always denying based on a "FALSE" out of node 102, a SmartFilter filter 126 and a Maximum Concurrent filter 128 are applied.

If the filters are not passed, control moves to Deny node 106 and the connection is denied. If, however, the two filters are passed, control moves to rewrite node 130. If the rewrite can be completed according to its criteria, control moves to Allow node 132 and the connection is allowed. Otherwise, control moves to Deny node 134 and the connection is denied.

Testing

In one embodiment, hooks are provided to allow testing of each decision node type. The abilities to query the node and to check its values (for the ones that can change) are also provided. The ability to get a complete description of all the ACLs from the kernel including the values of all the fields are also be provided.

Testing must include fully exercising the system calls. Building trees, changing nodes and thresholds must be carefully tested. Some of the testing hooks should make this work. Testing things like killing proxies using the kill command and making sure all relevant counts get decrement should also be checked.

In one such embodiment, a set of programs/system calls are provided which allow the user to debug the rules to see what is going on. In addition, the ability to get timing information may be needed. For such situations, firewall 34 should include a mode where the kernel will log how long was spent in each node.

The ACLs themselves must satisfy the requirements laid out by the decision tree. This dictates to a large degree how the rules must be implemented. Since the user has no direct access to the ACLs (rather they use the user interface), there are no ease of use concerns here except to say that the ACLs must be something the developers can work with easily. In particular, there must be a good set of tools to debug the ACLs.

Since the ACLs are going in the kernel, there must be no possible chance of blocking. Otherwise, we could starve the entire system and prevent anything from happening on the Firewall.

It is important that ACL checks happen as quickly as possible. Efficiency is crucial since the ACL system will be in constant use and slow ACLs will mean lag time for each connection. Further, since the ACLs are in the kernel, we will need to ensure that each call completes quickly to prevent locking up the machine by taking over the kernel.

The ACLs are the heart and brains of the access policy of the firewall. Thus it is important that failures, i.e. errors, result in denial of a service rather than allowing the service. This means all incomplete paths and invalid data will be equivalent to denying the connection.

A system and method of presenting and managing access control rules which can easily respond to changes in the number of networks and users has been described. The system results in an ACL mechanism which provides quick access to the ACL mechanism while at the same time maintaining a straightforward representation of complex functionality.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. In a computer network having a plurality of separate networks, an access control mechanism comprising:

a plurality of regions, including a first and a second region;

one or more services bridging said first and second regions;

access control rules which define a security policy, wherein the access control rules limit data transfer by the one or more services bridging the first and second regions, wherein the access control rules are defined as a decision tree, wherein the decision tree includes a decision node and a first and a second branch and wherein the decision node includes a true and a false destination path, wherein the true destination path leads to the first branch and the false destination path leads to the second branch; and access control logic, wherein the access control logic operates with the access control rules to enforce the security policy.

2. The access control mechanism according to claim 1, wherein the first and the second branches lead to other decision nodes.

3. The access control mechanism according to claim 1, wherein the decision tree further includes a filter, wherein the first branch leads to the filter.

4. The access control mechanism according to claim 3, wherein the first and the second branches lead to other decision nodes.

5. In a computer network system having a plurality of networks and a plurality of services, wherein each service defines a protocol for transferring data between two of the plurality of networks, a method of defining a security policy, comprising:

defining a plurality of access policies, including a first and a second access policy, wherein the first and second access policies limit access to one or more services, wherein defining includes creating a plurality of access policy routines, including a first and a second access policy routine, wherein the first access policy routine embodies the first access policy and wherein the second access policy routine embodies the second access policy;

forming a decision tree having a plurality of decision nodes, including a first, second and third decision node, wherein the first and second decision nodes enforce the first access policy and wherein the third decision node enforces the second access policy; and compiling a list of access control rules, wherein compiling includes replacing each decision node with one of the plurality of access policy routines.

6. In a computer network system having a plurality of networks and a plurality of services, wherein each service defines a protocol for transferring data between two of the plurality of networks, a method of enforcing a security policy, comprising:

defining a plurality of regions, including a first and a second region;

assigning each network to a region;

defining a first and a second service;

defining a plurality of access policies, including a first and a second access policy, wherein the first access policy limits communication between the first and second region using the first service and wherein the second access policy limits communication between the first and second region using the second service, wherein defining a plurality of access policies includes creating a plurality of access policy routines, including a first and a second access policy routine, wherein the first access policy routine embodies the first access policy and wherein the second access policy routine embodies the second access policy;

forming a decision tree having a plurality of decision nodes, including a first, second and third decision node, wherein the first and second decision nodes enforce the first access policy and wherein the third decision node enforces the second access policy;

compiling a list of access control rules, wherein compiling includes replacing each decision node with one of the plurality of access policy routines;

receiving a packet from the first region; and accessing the list of access control rules to determine if the packet should be forwarded to the second region.

7. The method according to claim 5, wherein forming a decision tree includes displaying the decision tree graphically and modifying the decision tree using a graphical user interface.

8. The method according to claim 6, wherein forming a decision tree includes displaying the decision tree graphically and modifying the decision tree using a graphical user interface.

* * * * *

UNITED STATES PATENT AND TRADEMARK OFFICE
CERTIFICATE OF CORRECTION

PATENT NO.    : 6,453,419 B1
DATED         : September 17, 2002
INVENTOR(S)   : Flint et al.

It is certified that error appears in the above-identified patent and that said Letters Patent is hereby corrected as shown below:

Title page,
Item [56], FOREIGN PATENT DOCUMENTS, after "8/1997" insert -- GO6F --.
Item [74], after "Kluth" insert -- , P.A. --.
Item [56], U.S. PATENT DOCUMENTS, delete "5,991,879" and insert -- 5,991,876 --; therefor.
Same reference, delete "Johnston" and insert -- Johnson --, Column 4,
Line 52, after "sessions" insert -- . --.

Column 7,
Line 27, after "into" insert -- a --.

Column 19,
Line 47, next to "microseconds" delete "+" and insert -- \ --, therefor.

Signed and Sealed this

Second Day of September, 2003

JAMES E. ROGAN
*Director of the United States Patent and Trademark Office*